United States Patent [19]
Plichta

[11] Patent Number: 5,996,332
[45] Date of Patent: Dec. 7, 1999

[54] METHOD AND APPARATUS FOR OPERATING A GAS TURBINE WITH SILANE OIL AS FUEL

[75] Inventor: Peter Plichta, Düsseldorf, Germany

[73] Assignee: Klaus Kunkel, Ratingen, Germany

[21] Appl. No.: 08/973,284

[22] PCT Filed: Mar. 26, 1997

[86] PCT No.: PCT/DE97/00612

§ 371 Date: Jan. 30, 1998

§ 102(e) Date: Jan. 30, 1998

[87] PCT Pub. No.: WO97/37115

PCT Pub. Date: Oct. 9, 1997

[30] Foreign Application Priority Data

Mar. 29, 1996 [DE] Germany .......................... 196 12 507

[51] Int. Cl.$^6$ ..................................................... F02C 3/20
[52] U.S. Cl. ..................................... 60/39.02; 60/39.461
[58] Field of Search ............................... 60/39.02, 39.06, 60/39.461, 722, 732

[56] References Cited

U.S. PATENT DOCUMENTS

| | | | |
|---|---|---|---|
| 3,665,862 | 5/1972 | Lane | 102/103 |
| 4,787,208 | 11/1988 | DeCorso | 60/732 |
| 4,912,931 | 4/1990 | Joshi et al. | 60/732 |
| 5,775,096 | 7/1998 | Plichta | 60/39.461 |

*Primary Examiner*—Louis J. Casaregola
*Attorney, Agent, or Firm*—Herbert Dubno

[57] ABSTRACT

The invention relates to a method of driving a shaft by reaction of silanes, preferably silane oils, with air in a double combustion chamber and an assiciated drive mechanism. The hydrogen of the silanes reacts in the first combustion chamber with an insufficient level of oxygen of the air supplied, thereby producing high temperatures. At said high temperatures, the nitrogen from the air supplied reacts with the silicon of the silane to form silicon nitride. The resultant combustion gases and dust and the non-combusted hydrogen are mixed in the second combustion chamber with a large quantity of cold compressed air, the hydrogen undergoing late burning, and they subsequently enter a turbine chamber to actuate turbine blades connected to a shaft. The method is particularly environmentally-friendly since no toxic or polluting waste gases are produced.

13 Claims, 1 Drawing Sheet

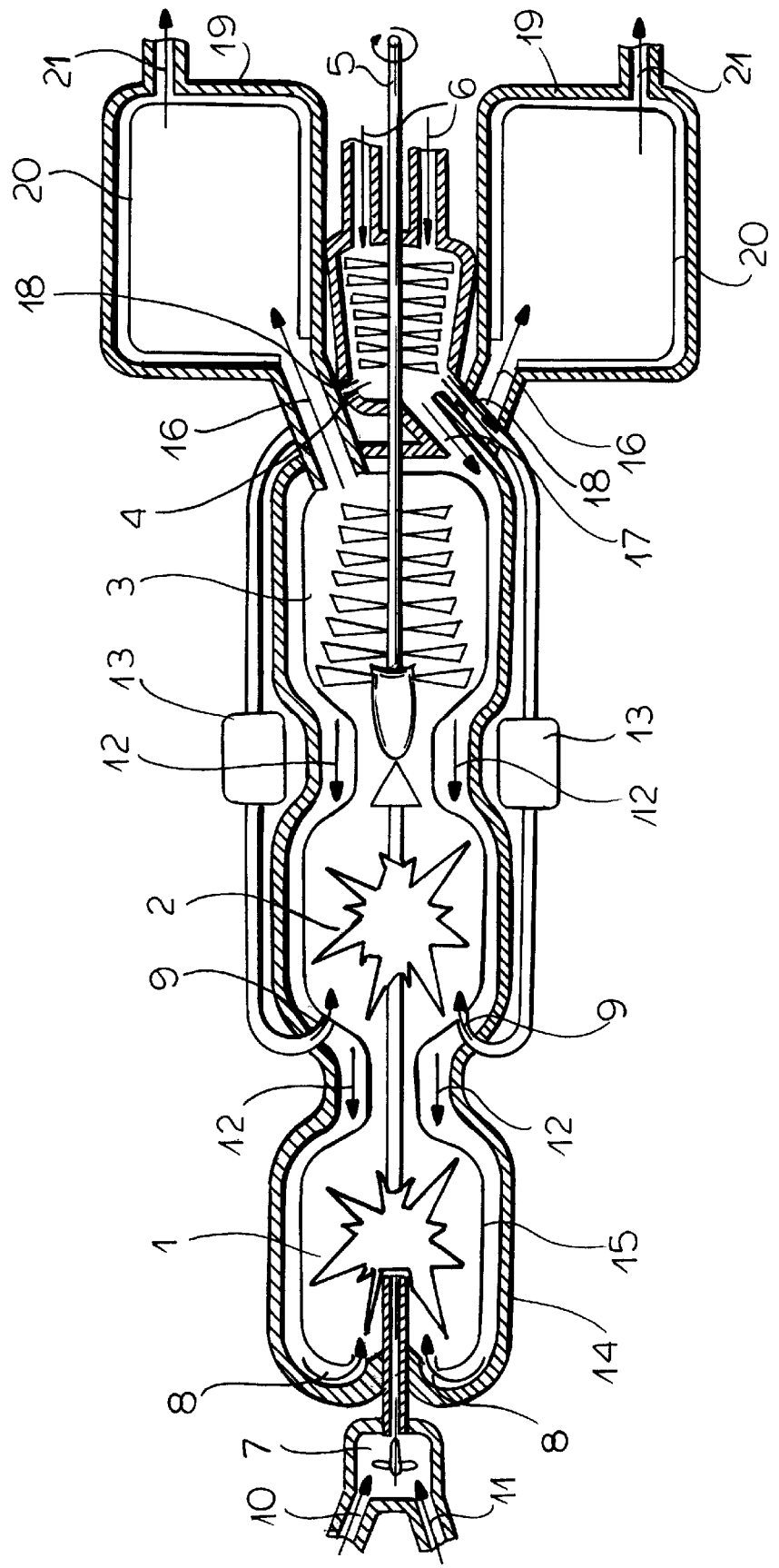

/ 5,996,332 /

METHOD AND APPARATUS FOR OPERATING A GAS TURBINE WITH SILANE OIL AS FUEL

SPECIFICATION

CROSS REFERENCE TO RELATED APPLICATIONS

This application is a national stage of PCT/DE 97/00612 filed Mar. 26, 1997 and based upon German national application 196 12 507.3 of Mar. 29, 1996 under the International Convention.

FIELD OF THE INVENTION

The present invention is directed to a method of driving a shaft as well as to a drive mechanism for carrying out such method.

BACKGROUND OF THE INVENTION

From DE-OS-22 31 008 it is known to use tetrasilane ($Si_4H_{10}$) as a rocket propellant. DE 42 15 835 c2 also describes silicon hydrides, preferably silane oils, as rocket propellants. The production of such silane oils is described in DE-PS 21 39 155. In the systems described in these publications the silane oils are burned together with liquid oxygen, liquid chlorine or liquid fluorine.

In the non-published German patent application P 44 37 524.7 (see also U.S. Pat. No. 5,730,390 of Mar. 24, 1998) a method for operating a reaction-type missile propulsion system and a drive mechanism for carrying out such method are described. The drive mechanism is operated in such a manner that silicon hydride compounds are reacted with nitrogen and/or nitrogen compounds at increased temperatures in the presence of an oxidizing agent for the hydrogen of the silicon hydride compounds. Preferably, the nitrogen and the oxydizing agent can be taken from the atmosphere of the earth so that a corresponding oxidizing agent for the silicon hydride compounds need not be carried along in the missile. Preferably, silane oils are burned as silicon hydride compounds.

OBJECT OF THE INVENTION

It is an object of the present invention to provide a method of driving a shaft as well as a drive mechanism therefor which operate with very high temperatures and a correspondingly high efficiency and which have little pollution effects.

SUMMARY OF THE INVENTION

According to the invention this the following steps:
a. introducing silicon hydrides and air into the first part of a double combustion chamber;
b. reacting the hydrogen of the silicon hydrides with a sub-stoichiometric amount of oxygen of the introduced air for the generation of increased temperatures;
c. reacting the excess of the introduced nitrogen of the air at the increased temperatures with the silicon of the silicon hydrides for the generation of silicon nitride;
d. discharging the combustion gases and combustion dusts and the non-burned hydrogen portion from the first part into the second part of the double combustion chamber and mixing these combustion products with a large amount of air with after-burning of the hydrogen; and e. directing the combustion gases and combustion dusts into a turbine chamber for driving turbine blades connected to a shaft.

The $N_2$-molecule as such, notwithstanding its triple bond, is extremely inactive and tends to open its linkage only with electron bombardment, for instance in thunderstorms, and reacts with oxygen so that nitric oxides are formed. However, above 1400° C. hot nitrogen reacts with finely distributed silicon and forms silicon nitride $Si_3N_4$. The reasons for this nitrogen combustion can be found in the fact that silicon, in contrast to carbon, cannot enter into double bonds or triple bonds. Nitrogen shows an especially good reaction performance with silicon hydride compounds. The invention takes advantage of this recognition and uses intentionally nitrogen or nitrogen compounds for the reaction with silicon hydride compounds whereby an especially efficient propelling system can be obtained. Nitrogen is at disposal in big amounts in the atmosphere so that a high efficiency with low costs results.

When burning silicon hydride compounds, especially silane oils, with compressed air the oxygen portion reacts with the hydrogen of the silane chain in accordance with the equation $$4H+O_2=2H_2O.$$

In this hydrogen-oxygen combustion temperatures of about 3000° C. are reached. This temperature is sufficient in order to crack the $N_2$-molecule which is presented by the supply of the compressed air. According to the equation $$4N+3Si=Si_3N_4$$

the nitrogen radicals now attack the free silicon atoms with extreme vehemence. Silicon nitride is formed which has a molecular weight of 140 and thus is nearly three times as heavy as carbon dioxide.

Of course, the cited reaction occurs only with correspondingly high temperatures. In the air silane oils after ignition burn only to develop red-brown amorphous silicon monoxide since the combustion substance has not enough oxygen on account of the rapidity of the combustion. No reaction with nitrogen takes place since nitrogen does not form any free radicals under these conditions.

In other words, at a sufficiently high temperature the silicon hydride compounds are ultimately thermally decomposed into Si and H. The highly reactive H-atoms bind the oxygen of the air for the generation of water. The linkage enthalpy of $H_2O$ becoming free thereby supplies necessary energy for achieving high combustion temperatures. The $N_2$-dissociation increases very much above about 2500 K. Since the oxygen is bound in water the highly reactive atomic nitrogen reacts with Si for the generation of $Si_3N_4$. During this reaction the very high linkage enthalpy of $Si_3N_4$ is liberated. It amounts to −745 kJ/mol at T=298 K.

Since air consists of oxygen for only 20% and since the oxygen/hydrogen reaction is energetically more beneficial than the oxygen/silicon reaction, the ratio between the supply of air and the supply of silicon hydride can be adjusted such that a portion of the hydrogen is not burned while the nitrogen combustion of the silicon takes place quantitatively. In this I prevent the generation of silicon oxides altogether. With a conventional jet engine the 80% hydrogen of the air are coaccelerated in a non-burned manner. The same occurs if silicon hydrides are burned with an excess of air. The generated silicon oxides would prevent confirming of nitrogen. Accordingly, the described method provides an air-breathing rocket propulsion unit since no oxygen tank has to be carried along and the mixture of the oxygen of the air and the nitrogen is 100% burned.

Preferably, as silicon hydride compounds silane oils, especially those with a chain length of $Si_5H_{12}$ to $Si_9H_{20}$, are used. Such silane oils are described in the already mentioned DE-PS 21 39 155. Surprisingly, such long-chain silanes are not self-inflammable in the air. They have the constistency of paraffin oils and can be manufactured simply. They can be pumped so that they can be supplied to an appropriate combustion chamber without problems.

According to the inventive method water vapor and silicon nitride dusts are generated. Both substances are not toxic and do not represent an environmental load. The generated dusts can be collected by filtering the combustion gases after leaving the turbine chamber while the gases substantially consisting of water vapor can be discharged into the atmosphere. Accordingly, the method and the corresponding drive mechanism have very little pollution effects.

Preferably, compressed air is introduced into the combustion chamber for improving the efficiency. The air is taken from the environment, is compressed by means of a compressor and is introduced into the combustion chamber. Preferably, the compressor is driven by the shaft.

Accordingly, air is taken from the atmosphere and is then preferably compressed. By contact of the air line with the walls of the double combustion chamber the same are cooled and thus protected from vaporization. The air heated to above 1500° C. helps to initiate the $N_2$-dissociation. Of course, the combustion chamber has to consist of metals suitable for this.

In order to save costs with the inventive method but also in order to completely exclude the silicon/oxygen combustion it can be advantageous to add powdered silicon or metal silicides, for instance magnesium silicide, to the silicon hydrides. It is known that magnesium reacts with nitrogen with the discharge of a large amount of heat.

After the start of the described combustion in the first chamber of the double combustion chamber and after the adjustment of the corresponding operating temperatures the method will run in the described manner, and a part of the non-burned hydrogen together with the hot $H_2O$—$Si_3N_4$ mixture with a temperature between 2500 and 3000° C. will flow into the second part of the double combustion chamber (after-burning chamber). These gases are much too hot in order to drive a shaft by means of turbine blades. Therefore, in the second part of the combustion chamber heat is directly used for compressing cold air.

Cold air compressed by the compressor is introduced into the upper part of the second combustion chamber through controllers. The combustion gases having a temperature of more than 2500° C. are cooled with a multiple amount of air, wherein simultaneously the non-burned hydrogen is afterburned. In this manner large amounts of turbine gases convertable into work are generated, which are introduced into a turbine chamber and drive the turbine blades there. As already mentioned, the turbine shaft is connected to the air compressor.

Practically, the outlet of the turbine chamber leads into a filter chamber which has an outlet leading to the atmosphere. In the filter chamber the silicon nitride dusts generated by the reaction are retained so that substantially only water vapor is discharged into the atmosphere.

BRIEF DESCRIPTION OF THE DRAWING

The invention is described below in detail by means of an example in connection with the drawing.

The sole FIGURE of the drawing shows a schematic longitudinal section through a drive mechanism formed according to the invention.

SPECIFIC DESCRIPTION

The drive mechanism consists of a housing including, in the FIGURE from left to right, in succesion, a main combustion chamber 1, an afterburner chamber 2, a turbine chamber 3 and a compressor chamber 4. The housing is restricted between the several chambers so that appropriate connection channels are formed. Of course, the housing is comprised of appropriate materials or is provided with suitable linings in order to withstand the increased temperatures (up to 3000° C.), especially those occuring in the main combustion chamber 1, as well as the occuring increased pressures.

A fuel mixing chamber 7 is located at the left end of the FIGURE. A conduit 10 for the supply of silane oil and a conduit 11 for the supply of silicon/metal silicide dust open into the mixing chamber 7. Furthermore, an appropriate mixing device is provided within the mixing chamber 7. A channel extends from the mixing chamber 7 into the main combustion chamber 1. A plurality of air supply apertures 8 are annularly disposed laterally from the central supply channel for the fuel (silane oil+Si/metal silicide).

These air supply apertures are connected to a supply conduit 12 for hot air annularly surrounding the main combustion chamber 1, the afterburner chamber 2 and the turbine chamber 3. The supply conduit 12 for hot air is connected to an outlet 17 of the compression chamber 4. Furthermore, the compression chamber 4 has an outlet 18 which is connected to a supply line 9 for cold air which laterally opens into the afterburner chamber 2. The supply line 9 for cold air extends through a controller 13 by means of which the supply of cold air into the afterburner chamber can be regulated.

A shaft 5 is centrally disposed within the turbine chamber 3 and within the compressor chamber 4 and extends through both chambers. The shaft 5 is rotated by the reactions taking place within the main combustion chamber and the afterburner chamber and can supply, for instance, mechanical energy or electrical energy through a generator. Turbine blades are disposed at the shaft within the turbine chamber 3. These turbine blades are driven by the combustion gases or combustion dusts entering into the turbine chamber from the afterburner chamber and rotating the shaft 5 hereby. Blades disposed within the compressor chamber 4 compress air entering through inlets 6 by means of the rotating shaft 5. The air is introduced into the conduits 9 and 12 through the outlets 17 and 18.

The turbine chamber 3 is connected through outlets for the combustion gases or combustion dusts to filter boxes 19 in which replaceable filter sacks 20 are disposed. These filter sacks 20 retain the dusts (substantially silicon nitride) while the combustion gases (substantially water vapor) are discharged to the atmosphere through outlets 21.

The above-described drive mechanism operates in the following manner:

Silane oil is pumped into the mixing chamber 7 through the conduit 10. Metal silicide dust is supplied through the conduit 11. These components are mixed within the mixing chamber. The generated mixture is introduced into the main combustion chamber 1 through the corresponding introduction conduit. The main combustion chamber 1 receives compressed hot air through the introduction apertures 8. The oxygen of the air reacts vehemently with the hydrogen of the silane oil. The nitrogen of the air reacts with the silicon of the silane oil and generates silicon nitride by the generated very high temperatures. The generated combustion gases or combustion dusts (with an excess of $H_2$) enter the afterburner chamber 2 into which compressed cold air is introduced through the conduit 9. The introduced cold air causes a combustion of the excess $H_2$ to form water vapor. The turbine blades in the turbine chamber 3 are applied with the gases and dusts discharged by the afterburner chamber 2 so that the shaft 5 is rotated. The corresponding gases and dusts leave the turbine chamber through the outlets 16, enter the filter sacks 20 within the filter chambers 19 in which the dusts are filtered, and are discharged into the atmosphere through the outlets 21.

I claim:

1. A method of driving a shaft, said method comprising the following steps:
   a. introducing silicon hydrides and air into a first part of a double combustion chamber;
   b. reacting the hydrogen of the silicon hydrides with a sub-stoichiometric amount of oxygen of the introduced air for the generation of increased temperatures;
   c. reacting the introduced nitrogen of the air at the increased temperatures with the silicon of the silicon hydrides for the generation of silicon nitride;
   d. discharging combustion gases and combustion dusts and a non-burned hydrogen portion from the first part into a second part of the double combustion chamber and mixing them with a large amount of air for afterburning of the hydrogen; and
   e. directing the combustion gases and combustion dusts into a turbine chamber for driving of turbine blades connected to a shaft.

2. The method according to claim 1 wherein compressed air is introduced into the first and/or second part of the combustion chamber.

3. The method according to claim 2, wherein the compressed air is generated by a compressor which is driven by the shaft.

4. The method according to claim 1, wherein hot air is introduced into the combustion chamber.

5. The method according to claim 4 wherein the hot air is generated by heat exchange with the wall of the combustion chamber.

6. The method according to claim 1, wherein the combustion gases and combustion dusts discharged from the turbine chamber are filtered.

7. The method according to claim 1, wherein silane oils are used as silicon hydride compounds.

8. The method according to claim 1 wherein at least one member selected from the group which consists of powdered silicon and metal silicides is added to the silicon hydrides.

9. The method according to claim 1, wherein the supply of oxygen of the air is regulated in such a manner that no silicon oxides are generated and thereby a portion of the hydrogen is not burned in the first part of the double combustion chamber.

10. A drive mechanism for carrying out a method which comprises the following steps:
    a. introducing silicon hydrides and air into a first part of a double combustion chamber;
    b. reacting the hydrogen of the silicon hydrides with a sub-stoichiometric amount of oxygen of the introduced air for the generation of increased temperatures;
    c. reacting the introduced nitrogen of the air at the increased temperatures with the silicon of the silicon hydrides for the generation of silicon nitride;
    d. discharging combustion gases and combustion dusts and a non-burned hydrogen portion from the first part into a second part of the double combustion chamber and mixing them with a large amount of air for afterburning of the hydrogen; and
    e. directing the combustion gases and combustion dusts into a turbine chamber for driving of turbine blades connected to a shaft, the drive mechanism comprising:
    a combustion chamber;
    a supply conduit for the silicon hydrides leading into the combustion chamber;
    a supply conduit for air leading into the combustion chamber;
    an afterburner chamber connected to the combustion chamber;
    a supply conduit for air leading into the afterburner chamber;
    a turbine chamber;
    a connection between the afterburner chamber and the turbine chamber for the introduction of the combustion gases and combustion dusts into the turbine chamber; and
    a drive shaft with turbine blades within the turbine chamber.

11. The drive mechanism according to claim 10, further comprising a compressor for the generation of compressed air for the combustion chamber and/or the afterburner chamber which is driven by the drive shaft.

12. The drive mechanism according to claim 10, wherein the supply conduit is in contact with at least one of the wall of the combustion chamber, of the afterburner chamber and/or of the turbine chamber.

13. The drive mechanism according to claim 10, wherein an outlet of the turbine chamber leads into a filter chamber which has an outlet leading to the atmosphere.

* * * * *